(12) United States Patent
Praenkel

(10) Patent No.: US 6,652,221 B1
(45) Date of Patent: Nov. 25, 2003

(54) WATER CURRENT TURBINE SLEEVE MOUNTING

(76) Inventor: Peter Praenkel, 2 Amherst Avenue, Ealing, London W13 8NQ (GB)

( * ) Notice: Subject to any disclaimer, the term of this patent is extended or adjusted under 35 U.S.C. 154(b) by 0 days.

(21) Appl. No.: 09/914,123
(22) PCT Filed: Feb. 23, 2000
(86) PCT No.: PCT/GB00/00634
§ 371 (c)(1),
(2), (4) Date: Aug. 23, 2001
(87) PCT Pub. No.: WO00/50768
PCT Pub. Date: Aug. 31, 2000

(30) Foreign Application Priority Data

Feb. 24, 1999 (GB) .............................. 99041063
Feb. 24, 1999 (GB) .............................. 99041071
Feb. 24, 1999 (GB) .............................. 99041089

(51) Int. Cl.[7] .................................................. F03B 13/12
(52) U.S. Cl. ..................... 415/3.1; 415/905; 416/244 R; 416/142; 416/174; 416/120
(58) Field of Search ........................ 415/3.1, 2.1, 4.2, 415/4.4, 905, 906; 416/244 R, 244 A, 246, 142, 174, 146 A, 122, 121, 120

(56) References Cited

U.S. PATENT DOCUMENTS

| | | | |
|---|---|---|---|
| 608,203 A | * | 8/1898 | Knobloch |
| 914,399 A | * | 3/1909 | Fancher |
| 1,670,140 A | * | 5/1928 | Cole |
| 4,095,918 A | | 6/1978 | Mouton, Jr. et al. |
| 4,143,990 A | * | 3/1979 | Atencio .................. 405/78 |
| 4,205,943 A | | 6/1980 | Vauthier |
| 4,289,971 A | * | 9/1981 | Ueda ...................... 290/52 |
| 4,306,157 A | | 12/1981 | Wracsaricht |
| 4,319,142 A | * | 3/1982 | Mayo, Jr. ............... 290/52 |
| 4,447,740 A | | 5/1984 | Heck |
| 4,524,285 A | | 6/1985 | Rauch |
| 4,755,690 A | * | 7/1988 | Obermeyer ............. 290/52 |
| 4,864,152 A | | 9/1989 | Pedersen |
| 5,281,856 A | | 1/1994 | Kenderi |
| 5,946,909 A | | 9/1999 | Szpur |
| 6,036,443 A | | 3/2000 | Gorlov |
| 6,168,373 B1 | | 1/2001 | Vauthier |
| 6,194,791 B1 | | 2/2001 | Wells |
| 6,327,994 B1 | * | 12/2001 | Labrador ............... 114/382 |
| 6,406,251 B1 | | 6/2002 | Vauthier |

FOREIGN PATENT DOCUMENTS

| | | |
|---|---|---|
| GB | 2256011 | 11/1992 |
| GB | 2307722 A | 6/1997 |
| GB | 2311566 | 10/1997 |
| JP | 11-044288 | 2/1999 |

OTHER PUBLICATIONS

Garman P., "Water current turbines" 1996, IT Publications, London, GB, XP002141579 131, pp. 17–18, 20–22.

* cited by examiner

Primary Examiner—Edward K. Look
Assistant Examiner—J. M. McAleenan
(74) Attorney, Agent, or Firm—Brinks Hofer Gilson & Lione (57) ABSTRACT

A flowing water actuatable turbine system, wherein the turbine system is mounted for operational co-operation with water current by means of an upstanding column/pile in such manner as to be axially displaceable length ways of the column/pile. The turbine system is preferably arranged to be rotatably about the longitudinal axis of the column. Floatation means can be provided for operationally supporting the turbines which can include blade pitch control.

16 Claims, 12 Drawing Sheets

WATER CURRENT TURBINE SLEEVE MOUNTING

CROSS-REFERENCE TO RELATED APPLICATIONS

This is a continuation of International Application Number PCT/GB00/00634 filed Feb. 23, 2000.

BACKGROUND OF THE INVENTION

This invention relates to water turbines and more particularly to turbines arranged to be driven by the action of a flow of water.

In our British Patent Application No 9706464.6 and in our British Patent No 2256011 B we have disclosed constructions of water drivable turbines.

As has been previously mentioned flowing water is a characteristic of tidal, marine, esturial or river currents.

Bearing this in mind the present invention relates in particular to the use of turbines for to produce either electricity directly or to produce rotation of a shaft for utilisation for a required purpose.

A known turbine arrangement intended for extracting kinetic energy from water currents, whether in a river or at sea, generally includes a rotor capable of interacting with the flow of water in such a way that some of the energy motion of the passing mass of water produces forces on the blades of a rotor thereby producing rotation of the rotor. The rotation of the shaft is utilise to perform some useful function such as to generate electricity. Such a device is analogous in principle to the better known concept of a windmill or wind turbine which extracts kinetic energy from flowing air, except that due to the much greater density of water as compare with that of air, lower fluid flow velocities (by a factor of approximately 9) are needed to give the same power density (power per unit area of flow) so that water moving at Im/s has a similar power density (e. g., watts per square metre) as air moving at 7.5 metres/second.

It is also to be noted that although the basic principles involved in extracting kinetic energy from water currents are similar to those involved in the better known art of extracting kinetic energy from the wind, the actual forces involved and the practical engineering requirements for the formation of suitable installation are in most respects totally different. In practice, tidal, marine and river currents generally have their maximum velocity near to the surface so that any device intended efficiently to intercept the kinetic energy of the currents needs to have its rotor set so that its active plane or cross section is perpendicular to the direction of water flow and as near as possible to the surface. Any such device also needs to be securely positioned in such manner as to resist the considerable drag forces and reaction forces associated with any interaction with large masses of moving water. In practice, the main drag force is an axial thrust in the direction of current flow due to the momentum deficit in the flow, which thrust is proportional to the area of the active rotor and the velocity squared. There is also a significant torque reaction to be resisted when a load is applied to the turbine rotor drive shaft. Furthermore, means has to be provided to convert slow rotational rotor movement produced by the water flow into a useful energy form that can be effectively transmitted from the generation location to a location at which it can be gainfully employed.

Such transmission of energy can be in the form of electricity by way of a marine cable along the sea or river bed (or by way of overhead cables supported by pylons or poles if the installation is close to the shore or river bank) there is also the option to use the energy "on site" for the production of some portable product such as fresh water, ice, minerals extracted from the sea or hydrogen and oxygen produced by electrolysis or any other products that can be generated from energy and the local environment, any such products can be stored and collected by an appropriate vessel, or transmitted to shore by pipeline.

For a practical installation there are other important factors that need to be addressed. In the case of marine applications such factors include the need to resist damage from large waves during storms, the need to make the device visible to minimise it as a marine hazard to shipping and the need to be able to service and repair as well as to deploy the device at sea both safely and at a minimum cost.

It is an object of the present invention to provide a turbine system that takes into account factors or matters such as mentioned above.

SUMMARY OF THE INVENTION

Broadly, according to a first aspect of the invention there is provided a flowing water actuatable turbine system including a column/pile upstanding; from the sea or a river bed, a stored and collected by an appropriate vessel, or transmitted to shore by pipeline.

For a practical installation there are other important factors that need to be addressed. In the case of marine applications such factors include the need to resist damage from large waves during storms, the need to make the device visible to minimise it as a marine hazard to shipping and the need to be able to service and repair as well as to deploy the device at sea both safely and at a minimum cost.

It is an object of the present invention to provide a turbine system that takes into account factors or matters such as mentioned above.

According to an aspect of the invention there is provided a flowing water actuatable turbine system, wherein the turbine system is mounted for operational co-operation with water current by means of an upstanding column/pile in such manner as to be axially displaceable length ways of the column/pile Conveniently, in the flowing water actuatable turbine system the turbine system is arranged to be rotatable about the longitudinal axis of the column.

According to a further aspect of the invention there is provided a water flow current turbine, wherein in order to accommodate change of the direction of water flow with respect to the turbine assembly arrangements are provided for controlling the pitch of the blades in response to change in direction of water flow through the turbine rotor.

A further aspect of the invention provides a water flow turbine installation, including a column/pile upstanding from a river or the sea bed to project above the water level, for supporting a water current turbine, wherein the operational pitch of the blades of the rotor are selectively adjustable.

Preferably the operational setting of the pitch of the turbine blades of the associated rotor is selectively settable throughout a range of 180 degrees of rotation.

Conveniently the turbine is so mounted to the column to be bodily displaceable length ways of the column/pile.

BRIEF DESCRIPTION OF THE DRAWINGS

For a better understanding or the invention and to show how to carry the same into effect reference will now be made to the accompanying drawings in which.

Figure 1:
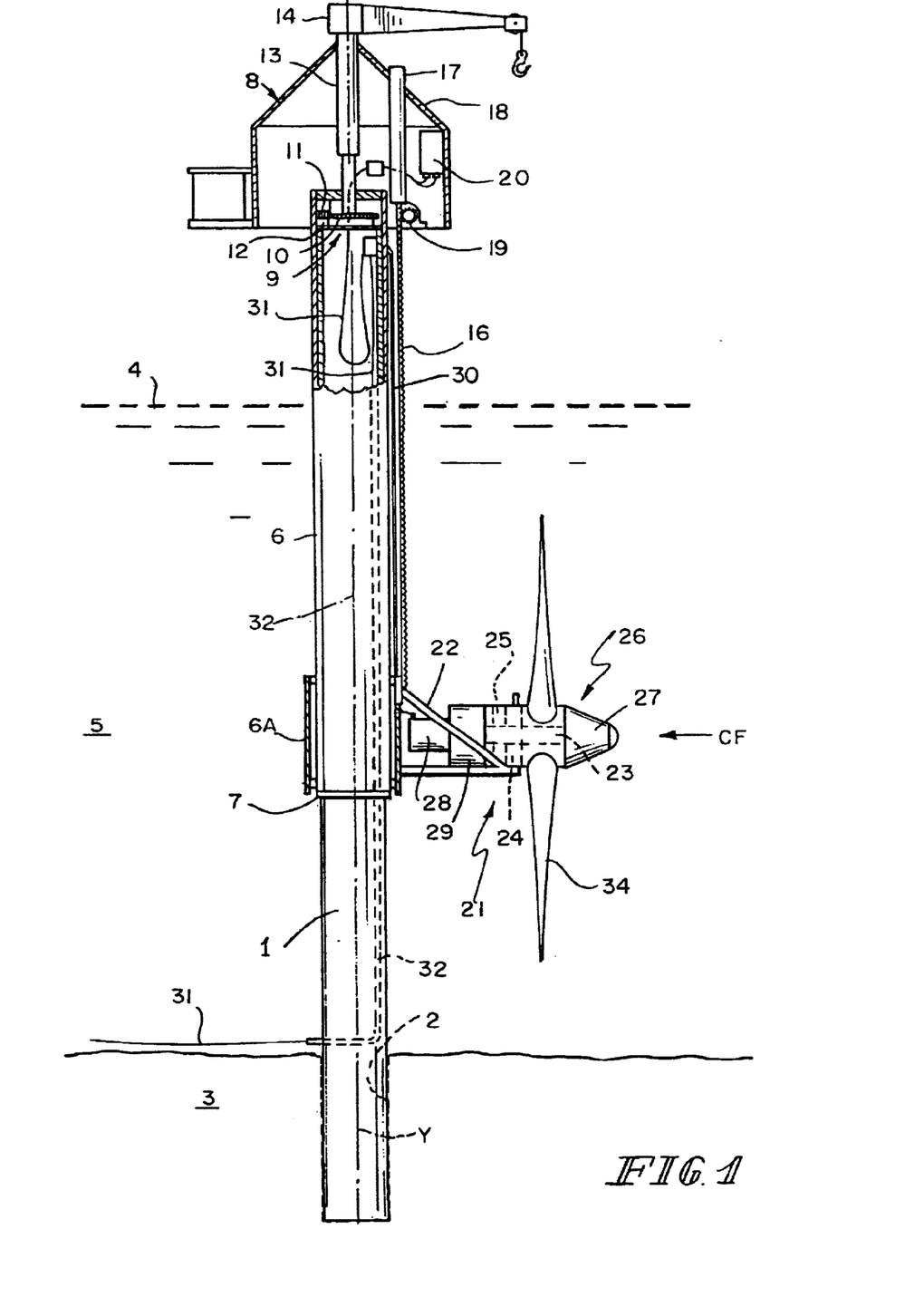
FIG. 1 schematically illustrates a first embodiment of a mounting column/pile and associated support sleeve for mounting a marine turbine, the turbine being shown in its operational position.
Figure 2:
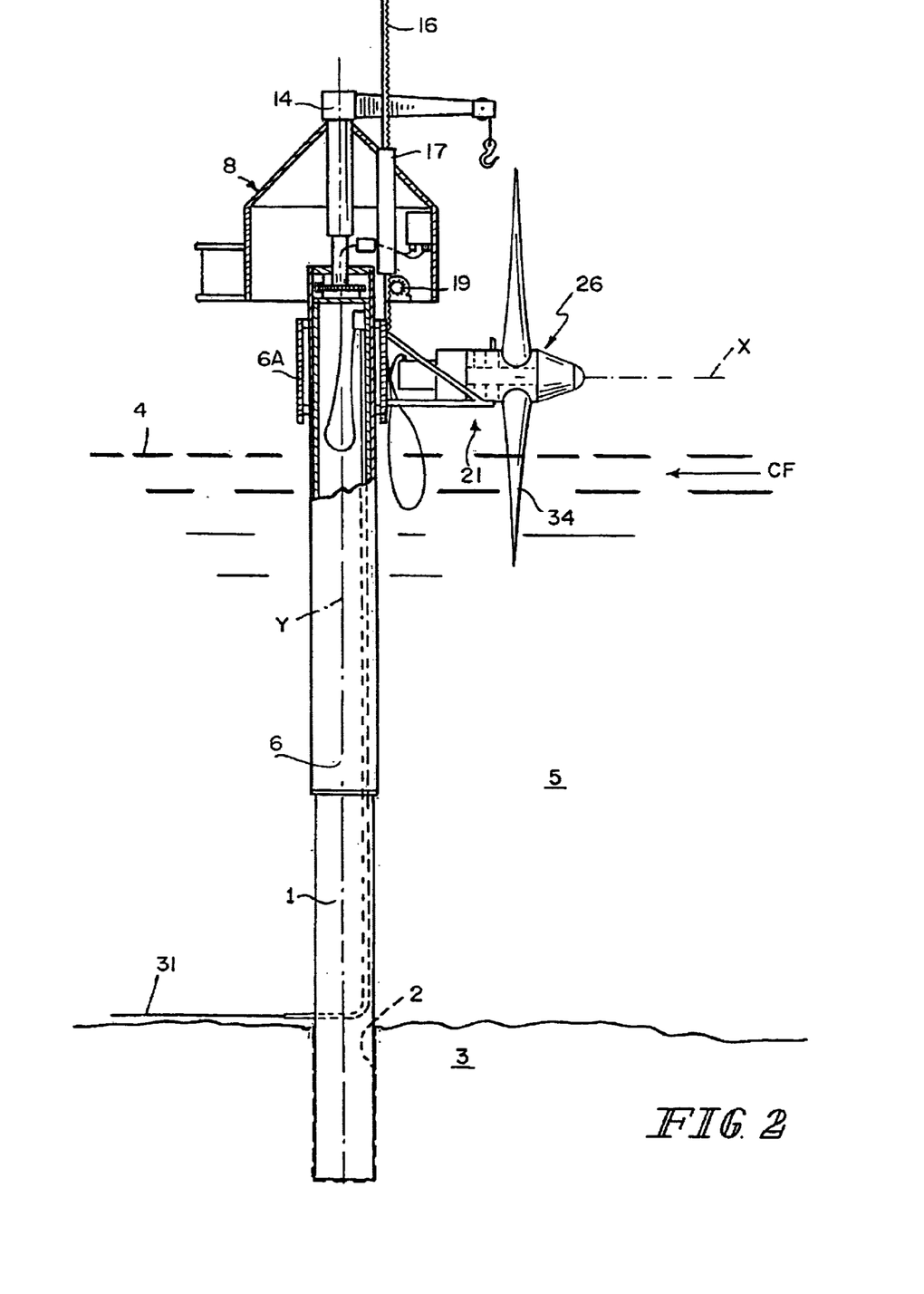
FIG. 2, schematically illustrates the turbine of FIG. 1 when it has been raised location above the surface of the water.
Figure 3:
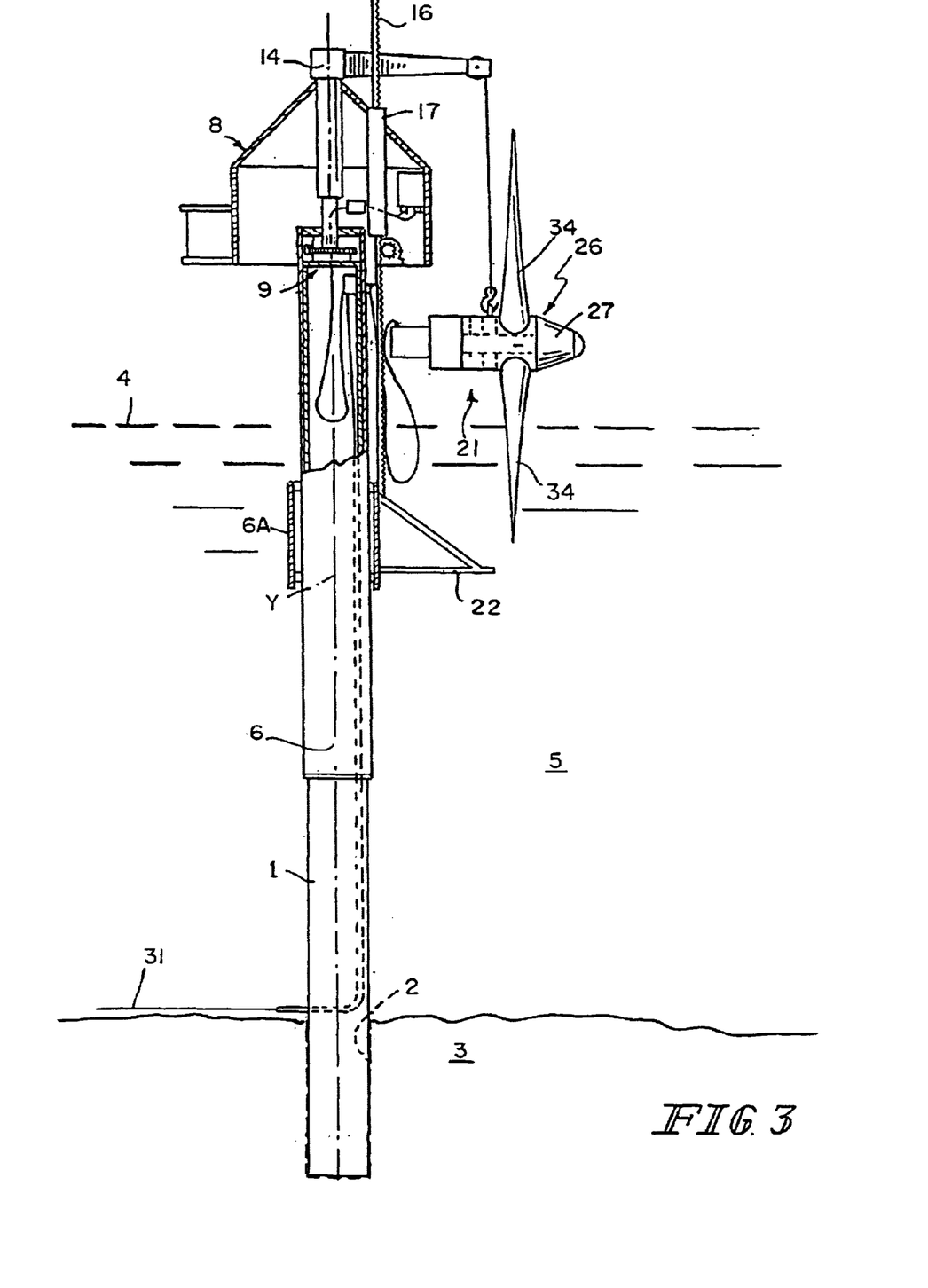
FIG. 3 illustrates the embodiment of FIGS. 1 and 2 when the associated turbine has been removed from its connection with the mounting column/pile.

Referring now to FIGS. 1 through 3, these Figures illustrate a column 1 upon which it is proposed to mount a water driven turbine unit 21. As will be noted the column 1 stands in an appropriately formed hole 2 in the seabed 3. The hole 2 can be formed with the aid of a jack-up barge having extendible legs, which can be caused to contact said sea or river bed while the hole 2 is being produced and whilst the column 1 is being set into the requisite operational position in the hole 2. The height of the column 1 can be such that it is tall enough to project about the surface 4 of the surrounding water 5 what ever the state of tides or flood levels of a river. A sleeve 6 fits closely around the column and is supported on thrust pads 7 (not shown in detail). These pads 7 are formed from a sea water compatible low friction material generally attached to the inside surface of the lower part of the sleeve 6. A rubbing ring (not shown) having non-corrodable finish is provided on the surface of the column 1.

A housing 8 is provided at the upper end of the column 1. The housing 8 incorporates a slewing mechanism 9 schematically shown as including a main gear 10 which connects with the sleeve 6. A worm wheel 11 meshes with the main gear 10. The worm wheel 11 receives drive from a suitable drive arrangement such as a servo motor 12. A smaller diameter extension 13 is provided at the upper end of the column 1. This extension 13 serves as a support for a crane or other lifting device/mechanism 14 the purpose of which will be discussed herein after.

The vertical setting or position of the outer sleeve 6A is controlled by a rack and pinion mechanism 15. The rack 16 thereof is mounted to the outer sleeve 6A and extends vertically upwards parallel to the vertical axis Y of the sleeve 6 with its upper portion engaging within an open-ended guide tube 17, which projects upwardly through the roof 18 of the housing 8. The pinion 19 of the mechanism 15 is suitably mounted within the housing 8 that it is effectively positionally constrained against displacement lengthways of the column 1. An electrical control box is schematically indicated at 20.

A water current turbine unit 21 is mounted by way of a support frame 22 carried by the outer sleeve 6A whereby displacement of the outer sleeve 6A lengths ways of the sleeve 6 will produce corresponding length ways displacement of the turbine unit 21. FIG. 2 illustrates the turbine unit 21 and associated outer sleeve 6A when in their raised positions. As will be seen the upper end of the rack 16 is then projecting out from the upper end of the guide tube 17.

The turbine unit 21 includes a main shaft 23 and associated bearings 24 which are journaled in the body/nacelle 25 of the turbine. A rotor assembly 26 is mounted on the main shaft 23.

The rotor assembly 26 can incorporate two, three, four or more blades 34 according to operational design requirements and expected mode of use. For the purposes of FIGS. 1 to 3 it will be presumed that the rotor assembly 26 is provided with two blades 34 equiangularly spaced about the axis X of the main shaft 23 of the rotor assembly 26. A faring 27 is provided to offer streamlining to water flow through the rotor assembly 26. The main shaft 23 is arranged to drive an electrical generator 28 though a suitable speed increasing gear box 29. Electrical output from the generator is fed by way of an output cable 30 which is guided upwards, conveniently, adjacent to the rack 16. The cable connects with the control box 20. The output from the control box feeds into a marine cable 31 which, by way of a conduit 32 extending axially of the column 1 leads downwardly of the column 1 to exit therefrom at the river or sea bed 3, the conduit 32 leading to a shore or river bank location (not shown). The arrangement of the slewing mechanism 9 on the rotatable sleeve 6 allows the turbine unit 21 to be yawed through a full 180 degrees to face the current flow CF when the tide changes direction. Thus, the rotor assembly 26 can thus be always operationally faced into the current flow CF and can, if desired, be disabled.

Referring now to FIG. 3 it will noted that in this Figure that the turbine unit 21 has been released from the support cradle 22 and lifted using the crane 14.

This arrangement makes it possible to service and/or remove and replace turbine units 21 without it being necessary to employ a so-called jack-up barge for this purpose.

In practice it is possible to slew the crane 14 so as to facilitate the handling of any load being carried by the crane 14. It will be understood that normally the turbine unit 21 would be released from its cradle 22 by removal of retaining bolts after the sleeve 6A had been raised to position on the sleeve 6 with the turbine unit 21 above water level 4, as shown in FIG. 2.

It will be appreciated that the arrangements shown in the FIGS. 1 to 3 and as so far described in relation to theses Figures represent a particular typical embodiment of a water turbine installation. Various variations may be made whilst achieving essentially a similar if not the same result. For example, a direct drive multi-pole generator may eventually be developed capable of rotating at the same speed as the rotor assembly 26 and therefore not needing a gearbox 29.

The gearbox 29 may be replaced by a hydraulic transmission system (using either suitable hydraulic oils or fluids or even sea water) and the generator 28 may then be driven by a hydraulic motor either in the nacelle 25 or even located remotely, such as above the column 1, in the housing 8 on top, or even remote from the installation with hydraulic transmissions pipes running along the seabed 3. The gearbox 29 can incorporate the shaft bearings 24 in some cases or it can be driven from a separately supported shaft via a coupling. The generator 28 can be external to the nacelle 25 for the purposes of cooling (using submersible motor/pump technology) and it may be filed with water or some other fluid to help avoid ingress of sea water.

Furthermore, it is convenient to note that a faring (not shown) could be provided on the side of the outer sleeve 6A remote from the turbine support frame 22, the faring being so shaped that it not only serves to streamline the column 1 and thus serve to reduce drag forces thereupon, but also, when the turbine 21 is in the yawed position with its rotor edge facing on to the direction of water current flow CF, the drag of the faring counterbalances the drag of the rotor assembly 26 and the nacelle 25 thereby to reduce tortional loads on the sleeve slewing mechanism 9.

Whilst the construction as above so far discussed allows for the rotation of the sleeve 6 to move the turbine to a yawed non operational position it is possible for the need to be able to rotate the sleeve can be avoided by so constructing the rotor assembly of the turbine unit so that the rotor assembly thereof incorporates pitch control such as is used in relation to aeroplane propellers blades, for adjusting the angle of set of the blades with respect to the flowing water direction.

Figure 4:
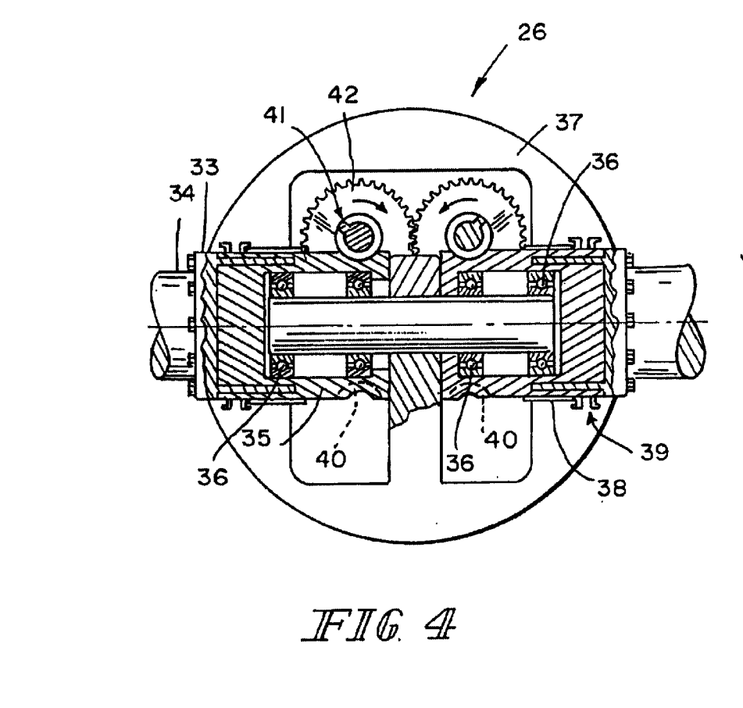
FIG. 4 is a schematic section view of an embodiment of a pitch control mechanism for a two bladed turbine rotor, taken on the line A—A of FIG. 6.
Figure 5:
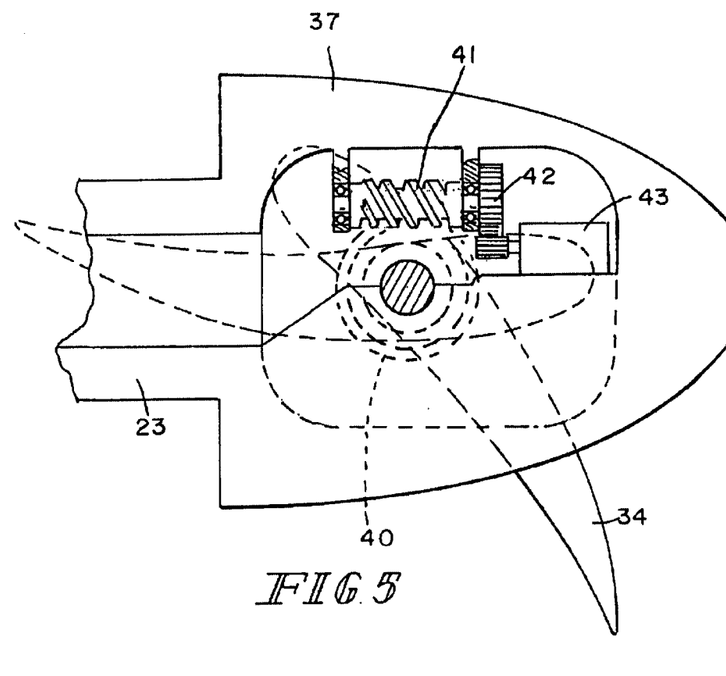
FIG. 5 is a schematic sectional view of the mechanism of FIG. 4, taken on the line B—B of FIG. 4.

Referring now to FIGS. 4 and 5 which illustrate a two bladed rotor assembly 26 incorporating pitch control. As is shown in these Figures, the root 33 of a blade 34 of the rotor assembly 26 is bolted or otherwise attached in an appropriate manner to a cylindrical body 35. The body 35 cooperates with bearings 36 set into a rotor hub 37 which is mounted to the rotor shaft 23.

The external cylindrical face of the body 35 runs in a bush 38 and emerges at the circumference of the hub 37 through seals 39 designed to prevent ingress of sea water into the hub The bodies 35 are machined with spiral teeth 40 to be able to mesh with a worm drive 41 driven via gears 42 by a servo motor 43.

Said servo motor 43 can cause the pair of worm drives 41 to rotate the same distance in opposite directions, thereby causing the rotor blades to move differentially by identical amounts.

Profiles of a rotor blade 34 outboard of the roots of the blades are shown in broken lines in FIG. 5 to illustrate how the blades 34 may be positioned to face the current in either direction or to lie with little or no effective of attack to the current in order to disable the turbine.

The embodiment shown in FIGS. 4 an 5 illustrates one mode of enabling the requisite change of pitch. It will be appreciated that other modes of enabling pitch change can be used.

Figure 6:
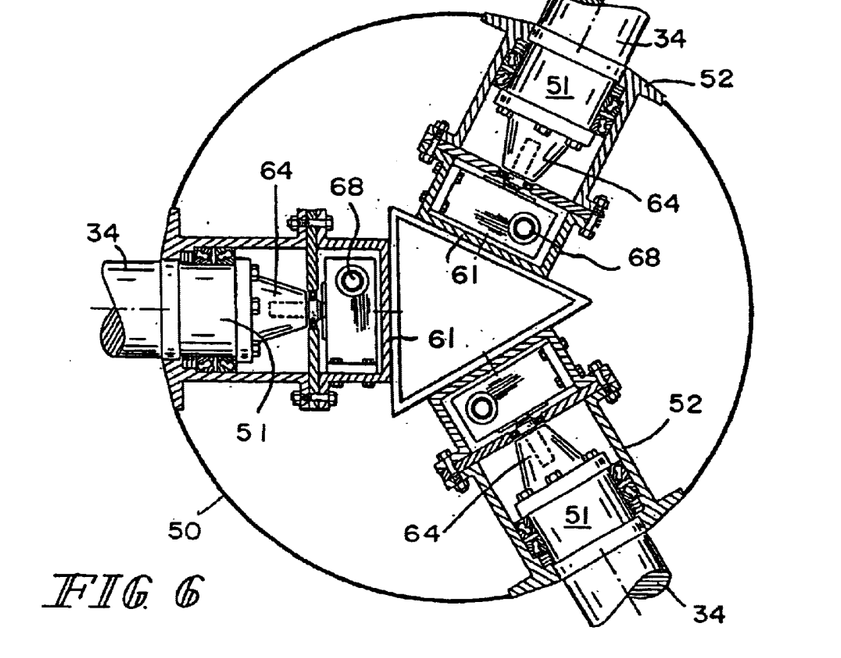
FIG. 6 is a schematic view of a pitch control mechanism for a three bladed turbine rotor.
Figure 7:
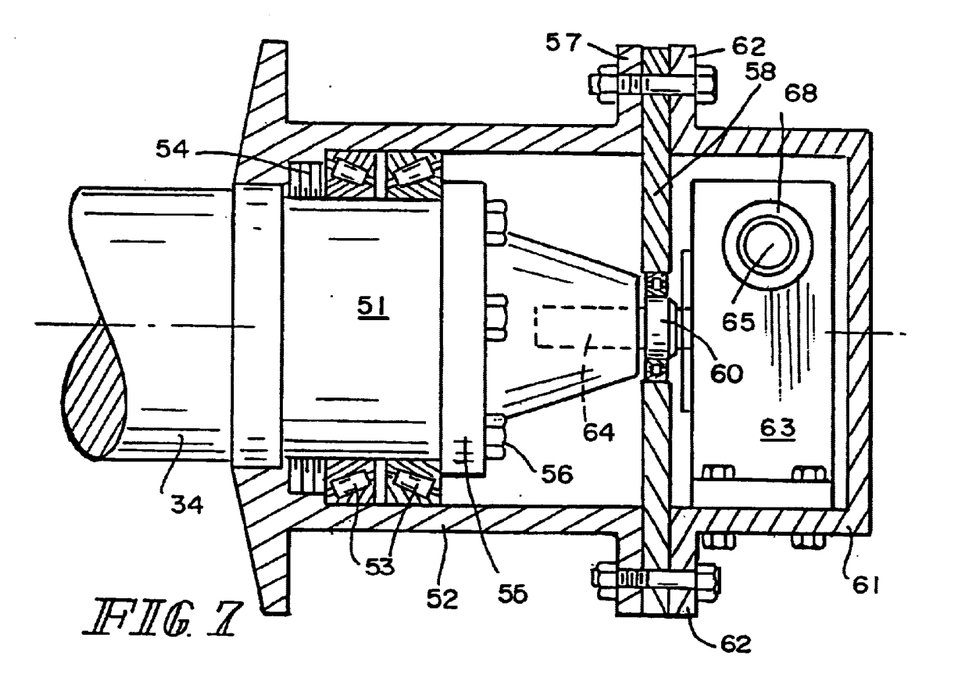
FIG. 7, is a an enlarged view of the pitch control mechanism associated with one of the blades of FIG. 6.

Thus, referring now to FIGS. 6 and 7, these Figures schematically illustrating the root portions of the blades 34 of a three bladed turbine rotor and associated hub 50. Three equiangularly spaced blade roots 51 are mounted in the hub 50 for rotation with the hub. In each case the root 51 engages with a cylindrical housing 52 that is secured to the hub 50. In each case the blade root 51 is engaged with a opposed taper main roller bearing 53. To prevent the ingress of water main seals 54 are provided adjacent the join between the root 51 and the housing 53. The main bearings 53 are held in place at a required pressure by a clamping plate 55 held in place by bolts 56. The inner end of the housing 52 terminates in an outwardly directed flange 57 which co-operates with an annular plate 58 which serves to support and position the rear bearing 60 for the blade root. A secondary housing 61 with a mounting flange 62 is secured to the opposite side of the plate 58. This secondary housing 61 provides support for a gearbox 63 whose output shaft 64 (shown dotted) is spindled into the end of the blade root 51. The input to the gear box 63 is by way of a shaft 65 which is the output shaft of a servo motor (not shown). It will be understood that operation of the servo motor rotates its output shaft 65, and in so doing causes the gearbox output shaft 64 to rotate the associated blade root 51 through an angle related to the extent of operation of the servo motor the latter being controlled by way of a control system such as a computer system (not shown). Thus in accordance with the concepts of this aspect of-the invention it will be appreciated that the arrangement provides up to 180 degrees of pitch variation for each rotor blade 34, as applied in the context of a water current turbine installed upon a fixed column or pile 1. With this pitch change possibility the turbine 21 can be operationally set to receive water flow from either direction or to be disabled without the need to yaw the rotors.

Hence it follows that the purpose of this form of variable pitch hub is to remove the need to move the nacelle 25 with respect to the flow of water in any direction where the water either flows continuously in the same direction or where it flows in opposite directions 180 degrees opposed, namely the situation that pertains in most marine and riverine current applications. The rotor blades 34 can be rotated to the optimum pitch angle to function with the current flowing one way. The rotor blades 34 can be rotated to be edge on to the current or feathered in the same way as with variable pitch aircraft propellers in order to stop or disable the turbine 21 even the water is flowing fast and they can be rotated to face the other way and operate efficiently with the flow direction reversed.

A further advantage of this arrangement is that the angle of attack of the blades can be automatically adjusted so as to perform some optimisation function such as allowing the rotor to run at constant speed yet at maximum efficiency for all current velocities in the operational spectrum of velocities (from cut-in velocity to rated velocity). It can then be used as a means of limiting either overload or over speed in velocities above the rated velocity ands as a means also for bringing the turbine to a halt under such conditions by reducing the effective angle of attack to zero. Another optimisation is to run the turbine at variable speeds so as to obtain maximum efficiency and hence maximum energy capture across the velocity spectrum.

Lastly it should be noted that when the pitch is reversed the shaft will rotate in the reverse direction too, so that the generator, hydraulic pump or other means of extracting the energy of rotation needs to be capable of functioning effectively when run in either direction.

Figure 8:
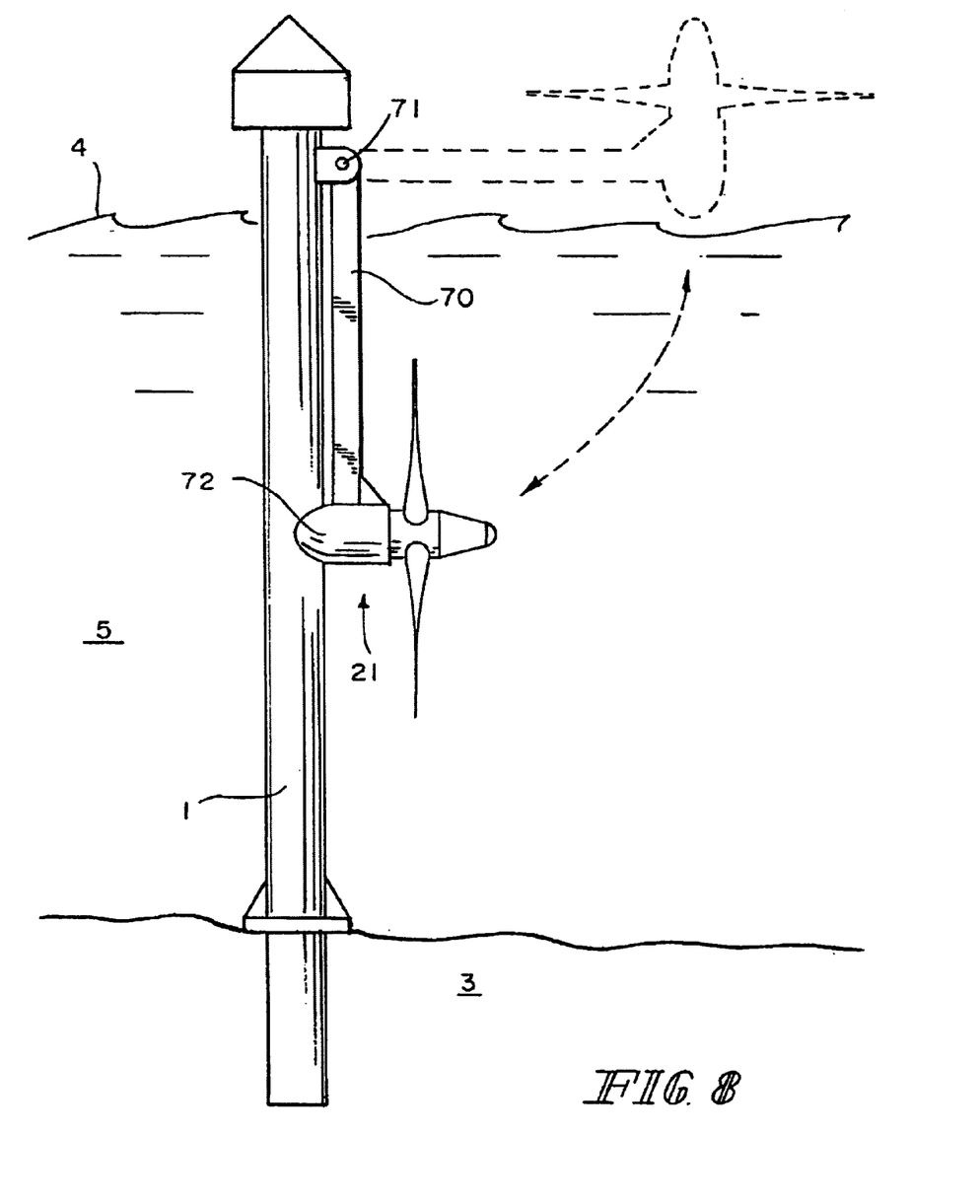
FIG. 8, schematically illustrates a further embodiment of the mounting of a turbine from an upstanding column.

Referring now to FIG. 8, this illustrates a further embodiment of a turbine installation in which illustrates an embodiment utilising a turbine 21 with a variable pitch hub as disclosed and illustrated FIG. 4 and 5 or 6 and 7. Since through the use of a variable pitch rotor it is no longer necessary to be able to yaw the rotor, this embodiment no longer uses a sleeve around the column/pile 1 in the manner discussed in relation to previous Figures but instead the turbine 21 nacelle is securely attached to a strut 70 which is pivoted about a pinned joint 71 above sea level 4 near the top of the column. It is therefore possible to raise the entire turbine 21 and strut 70 into a horizontal position above the level 4 of the water, as shown by the ghosted diagram, by lifting it so that the strut 70 rotates about the Pinned joint 71. Hence the turbine 21 can be readily be accessed, installed or removed by positioning them above the water surface 4. The lifting can be carried out using flotation bags or through the use of lifting equipment on a servicing vessel (not shown). When the turbine 21 and strut 70 are down and in the operational position, they are clamped to the supporting column/pile 1 by special fixings 72 that can preferably be released by remote control (either electrically or mechanically) from the surface.

The advantage of this embodiment of FIG. 8 is considered to be some reduction in material requirements through replacing the complication of sleeve around the column with a smaller strut, but may be offset by the complication of needing to use a variable pitch hub.

Figure 9:
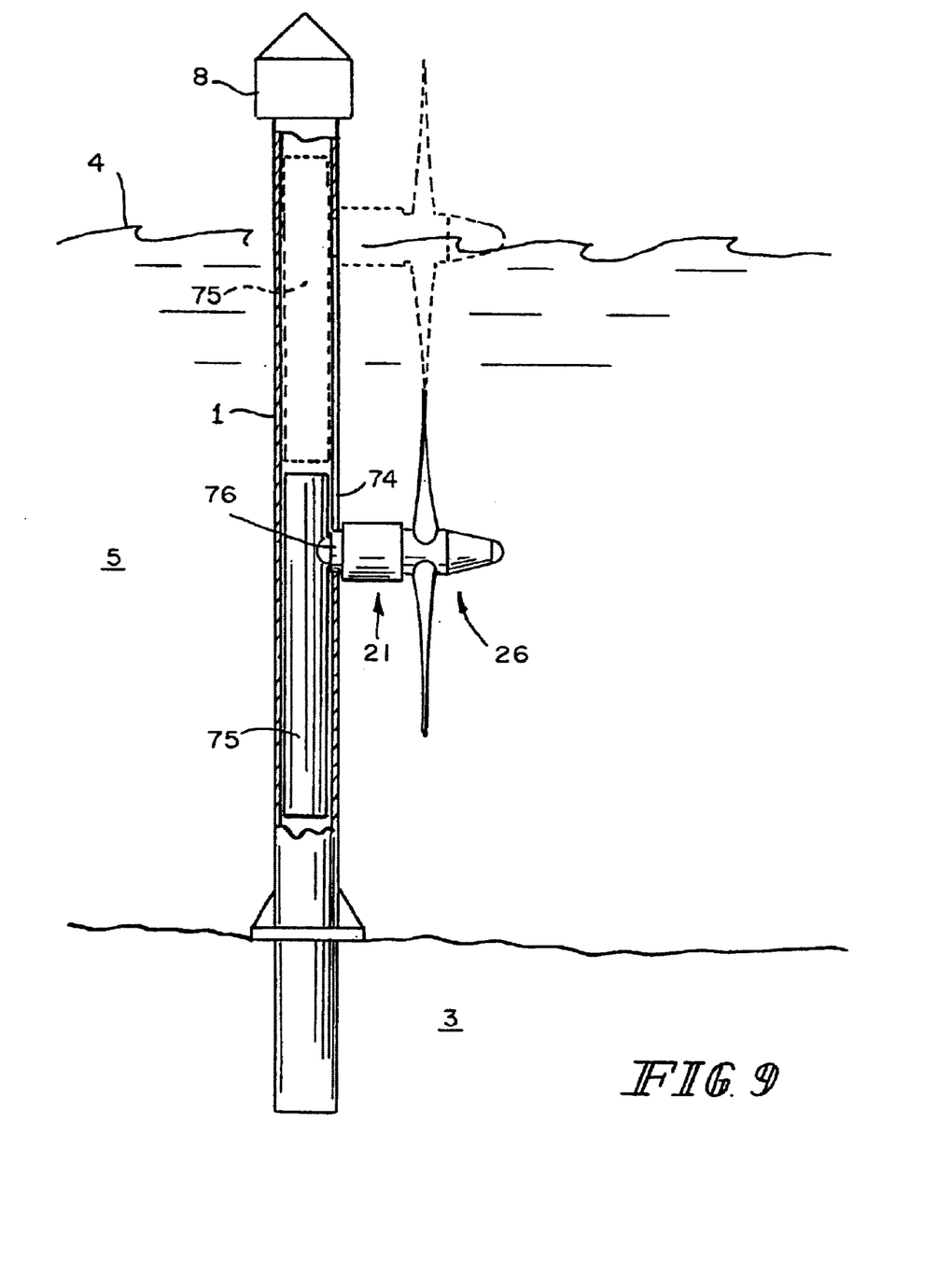
FIG. 9, schematically illustrates a still further embodiment of the mounting of a turbine to an upstanding column.

Referring now to FIG. 9, this Figure illustrates a further alternative way of using a turbine 21 with a variable pitch rotor. In this case the column/pile 1 (shown in part section) has a slot 74 cut vertically in the side where the turbine 21 to be placed. Inside the column is a close fitting closed cylindrical body 75 attached to the turbine 21 by a mounting bracket member 76 which projects through and can slide in the slot 74 and which carries the turbine nacelle 25 and rotor assembly 26.

The cylindrical body 75 is in the form of a tank which is internally sea water compatible and which can be filled with sea water while in operational mode with the rotor shown as positioned with solid lines. If the water in the body 75 is pumped out by displacing it with air from an air compressor, then buoyancy of body 75 causes it and the attached bracket member 76 and the turbine 21 mounted therefrom to rise to the position shown in ghosted lines, from where the nacelle 25 can be removed or replaced.

Although the use of buoyancy is one method for raising the nacelle 25, said nacelle could also be raised using appropriate more conventional and well-known lifting devices such as hydraulic jacks or an electric rack and pinion drive, an electric winch or any other appropriate lifting method. It is to noted that in accordance with the features of the invention the nacelle 25 is mounted to a body 75 internal to the column/pile 1 through a vertical slot 74 in such manner that the nacelle 25 can be raised above the water level 4 for access by applying the requisite lifting force to the body 75 internally of the column/pile 1.

Figure 10:
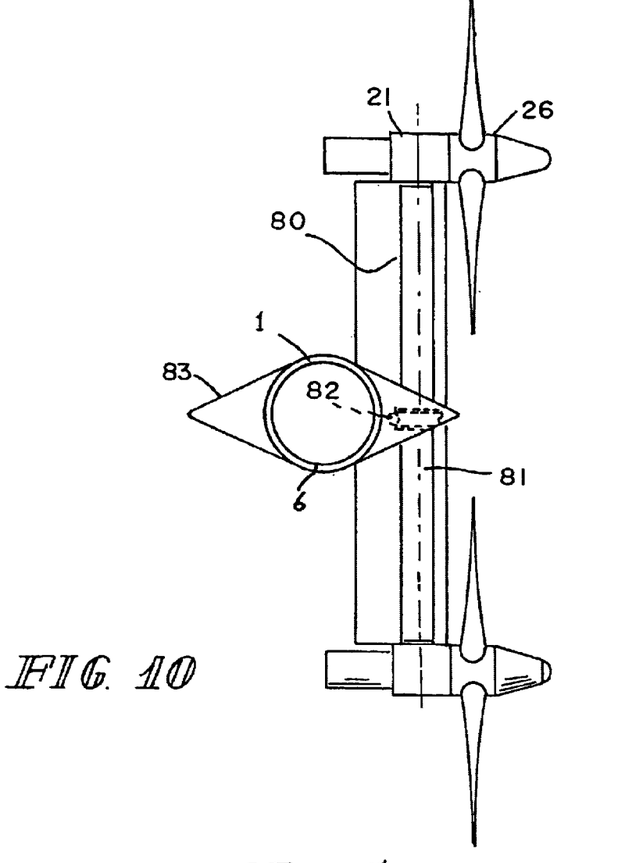
FIG. 10, is a plan view of a double turbine installation carried from a column.
Figure 11:
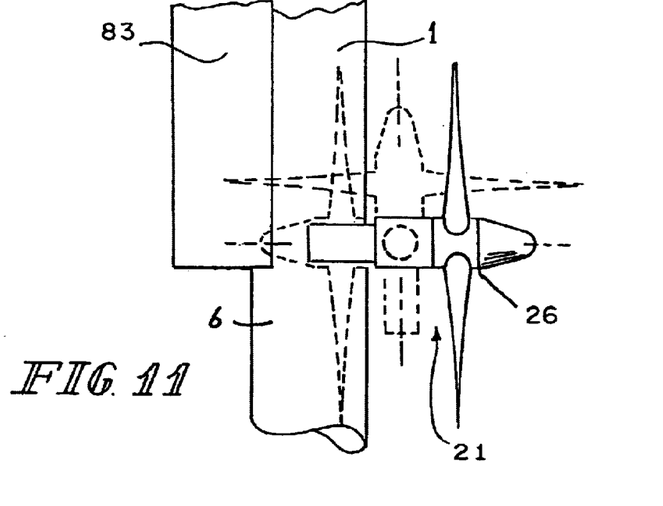
FIG. 11 as a side elevation of the installation of FIG. 10.

Referring now to FIGS. 10 and 11, these Figures show a further embodiment of a twin turbine assembly arrangement including turbines 21 with rotors incorporating pitch control. In this arrangement the turbines 21 nacelles 25 and the rotors 26 are attached to a cross arm 80 via a torque tube 81, which runs through the cross arm 80 and past one side of the column/pile 1. Said torque tube 81 is sufficiently strong to hold the turbines 21 in place under operational conditions and is also capable of being driven by a slow high torque actuator such as an electric motor with a worm gearbox assembly 82 so as to be able to rotate the turbines and rotors through 180 degrees about the axis of the torque tube 81 such that after a 90 degree rotation the turbines are moved into a vertical plane of rotation as shown ghosted in FIG. 10. By rotating the turbines 21 so that they point vertically upwards the rotors 14 can be disabled even in full flow.

Furthermore, to be able to effect a rotation of 180-degrees the rotors can be positioned to face in either direction depending on whether the tide is ebbing or flowing. Since with this arrangement it is not necessary for the sleeve to be able to rotate about a vertical axis, a faring such as the faring 83 can optionally be fitted on both the upstream and downstream sides of the pile.

The advantages of this arrangement are saving of costs in some situations combined with the probable performance enhancement gained from a greater blockage to the flow of water as compared with that achieved by a single turbine unit. Generally, but not necessarily, the rotors 26 are arranged so as to rotate in opposite directions, thereby cancelling out the torque reaction on the column and also in producing contra rotating swirl components in their wakes which will rapidly cancel each other out thereby leading to less turbulence downstream of the rotors. It is considered that this arrangement would be of importance when installing as many as possible turbine installations into a particular area of the sea by allowing closer spacing in the directions of flow through the several turbine installations.

For this propose a servicing vessel would manoeuvre alongside so that the vessel can remove either the complete cross arm and nacelle assembly as a single unit or the individual nacelles from the cross arm.

Referring now to 12, this Figure illustrates an alternative embodiment of a twin rotor system in which the twin rotors 26 are supported by means of a support assembly 90 including arms 91, 92 each suspended by way of massive pivots 93 to a suitable support ring or the like 94 close to the top of the column/sleeve 1. The turbines 21 are mounted on the outer/free ends of the arms 91, 92. In the Figure the arms 91, 92 are shown in the positions in which the turbine assemblies 21 are in their operational positions and are maintained in the inclined positions shown. The arms 91, 92 with the turbines 21 can be raised into the positions shown ghosted in the FIG. 12 either by using lifting equipment from a servicing vessel, or from the top of the column by the use of chains as indicated in relation to previous Figures or by using buoyancy from flotation bags (not shown) attached to the turbines or to the arms 91, 92.

Figure 12:
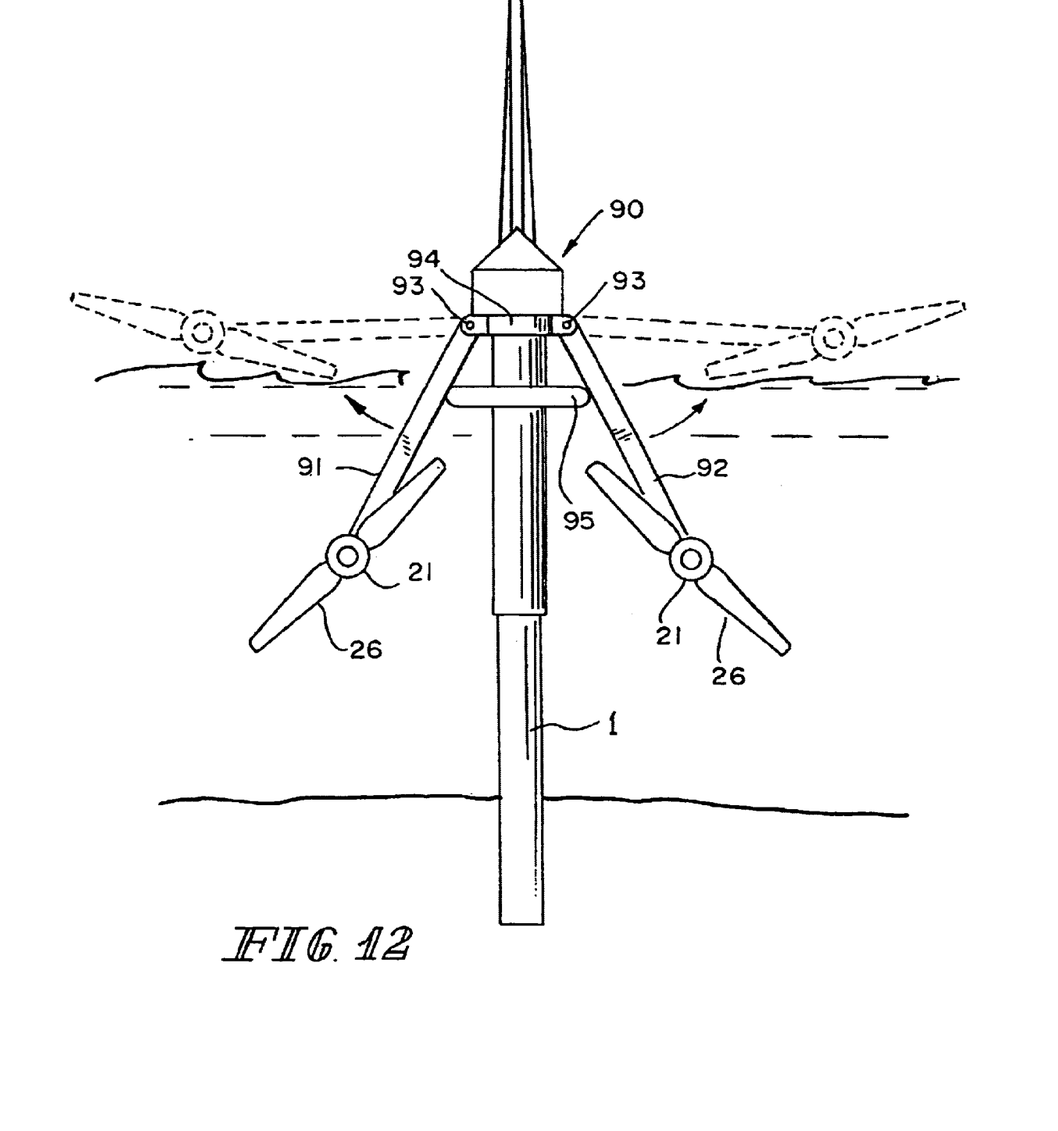
FIG. 12 schematically illustrates a turbine installation involving two turbines mounted from a common column.

The turbines and the two arms 91,92 can fall under the influence of gravity to the operating position beneath the water surface 4 and are positioned by the lower limit of their travel against massive "stop" member 95 securely attached to the column sleeve. Said "stop" member 95 carries fixings or catches (not shown) which engage with the arms 91,92 to prevent them losing contact with the "stop" member 95 under operational conditions. The fixings or catches can be released mechanically or electrically at times when it is required to raise the arms and nacelles, down force can be generated by the flow of water to ensure that they are securely pressed against the "stop" member 95 under all operational conditions. This may in some cases be a preferable solution in case of mechanical integrity of movable fixings and the linkages cannot be guaranteed in a submerged environment.

Figure 13:
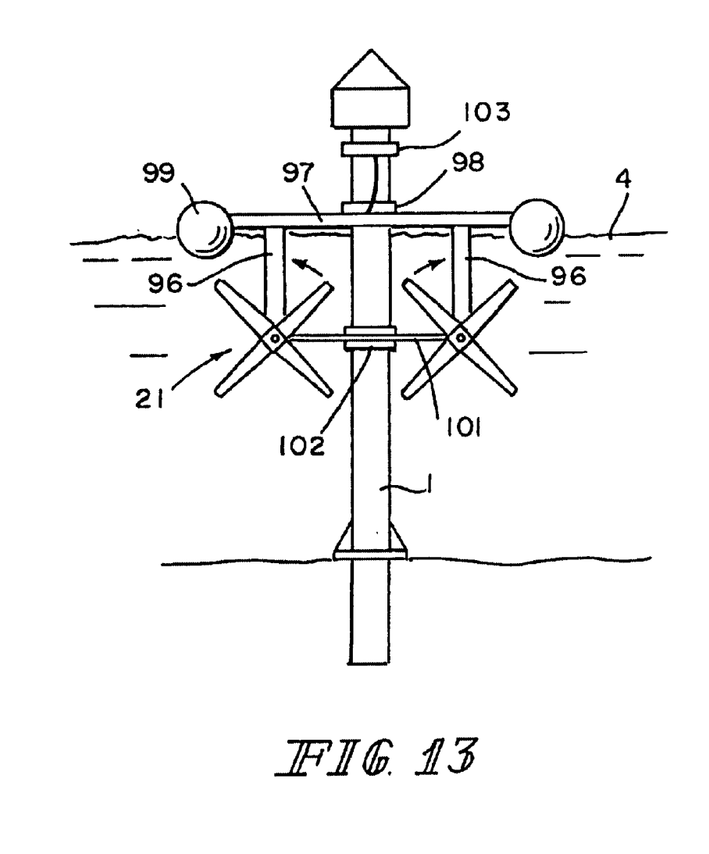
FIG. 13 is an end on view of a further embodiment of a turbine installation involving two turbines.
Figure 14:
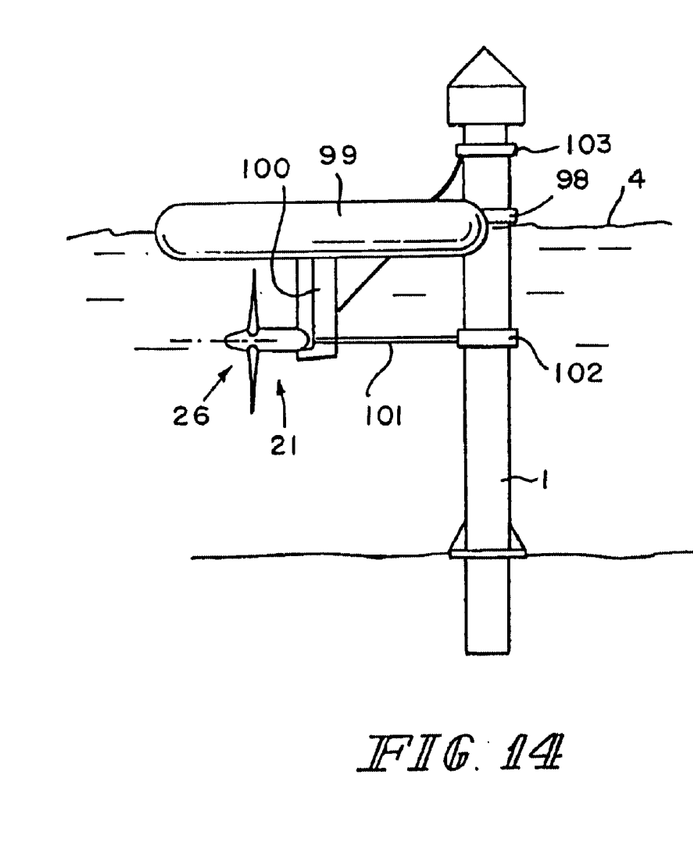
FIG. 14 is a side view of the installation of FIG. 13.

Referring now to FIGS. 13 and 14, these Figures schematically show a still further embodiment of a twin rotor arrangement. It will be appreciated that the concepts utilise in relation to these Figures can be used in conjunction with a single rotor installation or with a four rotor installation. The purpose of this embodiment shown in FIGS. 13 and 14 is to incorporate arrangements for facilitating the installation of and the removal of the turbines 21 and nacelles 25 by having them mounted below a floating structure which is in turn held in position by the pile 1. Thus in the FIGS. 13 and 14 embodiment the turbine assemblies 21 are carried from vertically arranged support structures 96 which are carried from a horizontal further support structure 97 mounted to the upper part of a rotatable ring/sleeve 98 provided upon the column 1. A hull 99 is connected with the outermost part of the support structure 97. These hulls 99 provide the requisite flotation to the turbine assemblies 26 and associated support structures. The vertical supports 96 have associated therewith struts 100 as shown in FIG. 14 much like keels, the latter being streamlined.

The lower ends of the support structures 96 connect with a strut 101 which is secured to a ring 102 rotatable about the column 1. Electrical connections from the generators associated with the turbine assemblies are taken from the assemblies at a point above the water surface 4 to another ring 103 that is constrained to turn in unison with the ring 98.

The installation shown in FIGS. 13 and 14 always operates downstream of the column/pile, since it is oriented by the considerable drag force of the supporting hulls 99 and the rotors assemblies 26. In situations, where the water flows are tidal, the entire floating component can swing around through the freedom of rings 98,102 and 103 to turn with respect to the column/pile when the direction of the flow of the tide periodically changes. To avoid the cable connection from the ring 103 becoming increasingly wound up as a result of such rotation, the load on the rotors assemblies 26 can be differentially adjusted under control of a computer system so as to bias the entire unit always to follow a 180 degree movement backwards and forwards rather then a full 360 degree movement. This control is achieved by loading the generators differently in such a way that the drag on one rotor is less than the drag on the other.

An advantage of the system shown in FIGS. 13 and 14 is that the floating component can readily be removed and replaced and also it has the benefit of a positive mooring from direct attachment to a column/pile 1. In practice this embodiment is best suited for use in unidirectional currents such as in rivers, where there is no need to yaw the system through 180 degrees. Moreover the system shown in FIGS. 13 and 14 it has the advantage, in major rivers with great seasonal changes in level, that the flotation component can move up or down according to changes of surface level, always maintaining the turbine rotors at optimum depth for maximum power.

Figure 15:
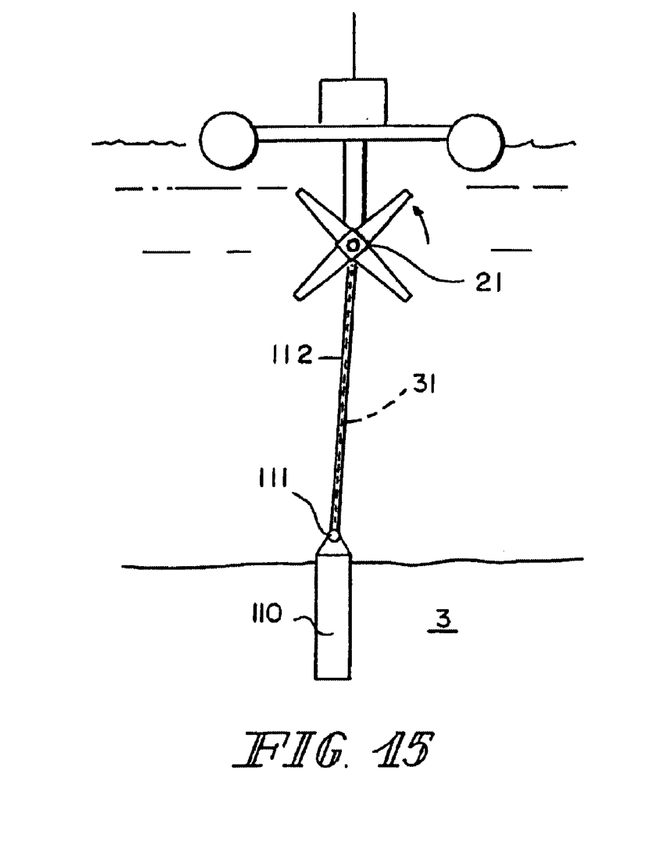
FIG. 15 is a facing view of a turbine installation involving floating support for the turbine.
Figure 16:
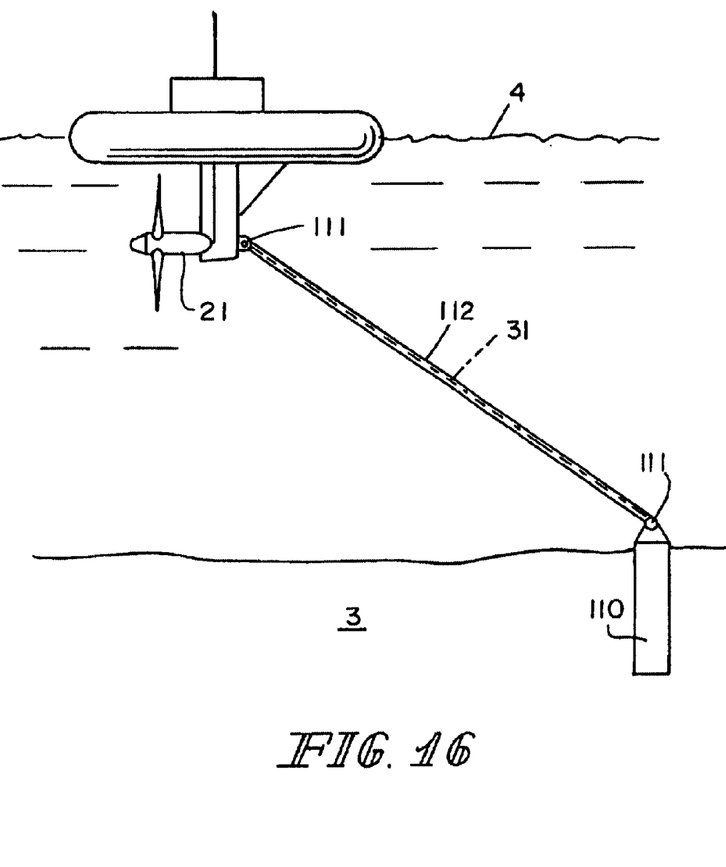
FIG. 16 is a side view of the embodiment of FIG. 15.

Referring now to FIGS. 15 and 16, these figures illustrate schematically an installation intended for use in depths of water where a column/pile 1 that projects above the water surface 4 would be excessively tall and costly. In this case a short column/pile 110 is driven into the sea or river bed 3. This column/pile 110 carries a ball joint 111 which is in turn attached to a rigid strut 112 interconnecting via another ball joint 111 with a floating turbine system similar to that previously described in relation to FIGS. 14 and 15. The rigid strut 112 is conveniently adopted for carrying the marine cable 31 including the electrical output of the generator of the turbine unit 21 from the floating turbine system to the relative calm conditions of the seabed or riverbed 3, from where it connects to the shore.

An important aspect of the arrangement shown in FIGS. 15 and 16 is that the provision of the rigid strut 112 rather than conventional flexible moorings or ropes through use of a column/pile as an anchor. The structural integrity and reliability of the modified version is an enhanced reliability of mooring, and moreover the marine cable is better protected by being carried on or within a rigid member such as the above-mentioned strut. This component can move up or down according to changes of surface level, always maintaining the turbine rotors at optimum depth for maximum power.

If desired two columns similar to that of the above discussed Figures may be installed in such manner that they support a much wider horizontal arm that can carry as many as for example, five variable pitch rotor assemblies. Thus two columns are arranged side by side and then linked together with an appropriately long cross arm carrying five turbine assemblies. The lifting mechanisms would be driven in unison to ensure that the turbines can be raised smoothly with their supporting arm remaining horizontal at all times. Since these turbines are of the variable pitch type they can accept the flow from either direction and also they can be disabled by setting the rotor blades at a pitch such that no effective torque is produced. The reason for a system of this kind is for use in shallow water where lack of depth requires the use of a number of small rotors to gain, the required power rather than the use of one or two larger rotors displaceable outer sleeve such as disclosed in FIG. 1.

Figure 17:
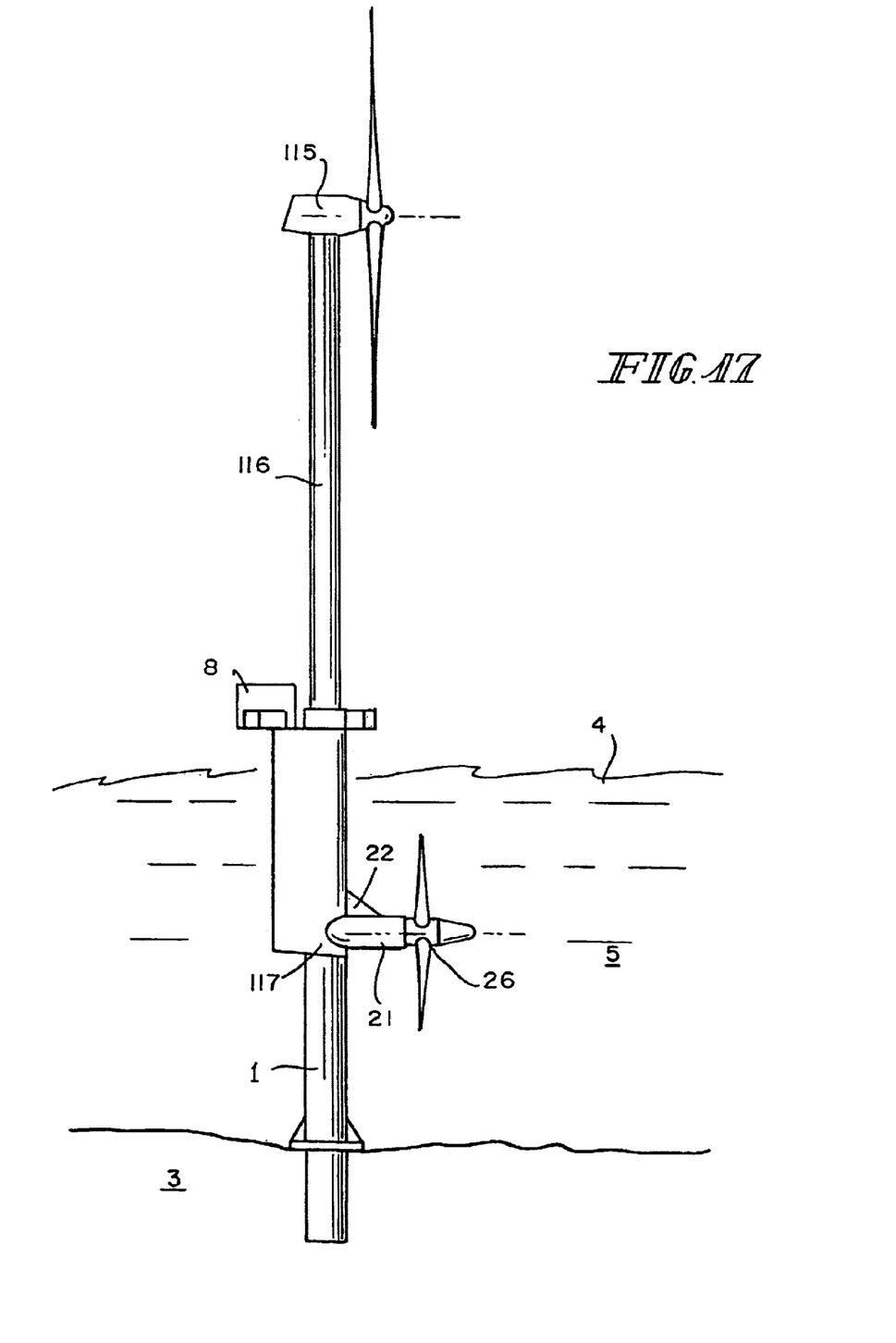
FIG. 17 is a schematic view of a turbine installation involving a water current flow turbine and an air driven turbine.

Referring now to FIG. 17, this Figure illustrates-schematically a turbine support column 1 which has been adapted or modified to provide support for a water driven turbine unit 21 and an air driven turbine 115. As will be noted the overall height of the column 1 has been increased by effectively providing an extension 116 to the upper part of the column 1. This extension column 116 serves to support the air driven turbine 115. As is shown in the FIG. 17, the housing 8 takes a different form and position on the column to allow for the extension column 116. The housing 8, as with the previously discussed housing construction, incorporates arrangements for controlling the positioning of a sleeve 117 that carries the water current turbine. In the FIG. 17 the construction of the sleeve 117 is such that it carries the turbine unit 21 from an associated support frame 22. In addition, the length of the sleeve 117 is such that the housing 8 is always above the water level 4 what ever the state of a tide and river level. With this arrangement in order to avoid the need to provided for rotation of the sleeve the rotor 26 of the turbine unit 21 would incorporate the facility of pitch control such as that discussed above in relation to FIGS. 4 to 7

As will be apparent from FIG. 17 relationship between the column 1 and the extension 116 thereof is such that the sleeve 117 on the column can be raised sufficiently to position the water driven turbine above the water level 4, for example, for the purposes of maintenance and or replacement.

The arrangement of the water current turbine 21 and the air current turbine 115 provides a hybrid combination of wind and water powered equipment (not shown) for utilising the energy obtained by the respective turbines. An advantage of installing a wind turbine 115 on the column/pile is that the overheads involved in installing a column/pile 1 and connecting it to an electricity grid on the shore are high, so by adding a wind turbine 115 significantly more energy can be captured from a single/common installation. This requires the use of a stronger column 1 having thicker walls to handle the increased bending moment caused by the wind turbine 115. However, it is considered that the extra energy gained would outweigh the extra installation costs. In a variation the wind turbine 115 is mounted from a tower provided at the top of the column/pile 1.

In the FIG. 17 embodiment the wind is shown blowing from the same direction as the current. However, the wind turbine 115 would be of the kind, which can orient its rotor automatically to face in the direction from which the wind blows so that the wind turbine rotor may face in any direction. That is to say the support arrangements for the air driven turbine 115 would be such as to enable such rotation.

The water current turbine 21 will either be of the kind mounted upon a sleeve which can be yawed through 180 degrees to face the current from either direction or it can have a variable pitch rotor in which the rotor blades can be pitched through as much as 180 degrees to take energy efficiently from flow in either direction. In the FIG. 17 both turbines are shown in their operational positions It will be understood that if desired the installation could incorporate two water current flow turbines carried from the associated common support column.

Also it is possible to provide multiple turbine installations in which a turbine carrying cross bar for water current flow turbines is provided between two spaced columns Similarly air a corresponding number of air flow turbines could be provided upon a cross bar arranged above water level.

As a further aspect of the invention where the column/pile is of such length as to project well above the water surface a wind turbine can be mounted at the top of the column/pile of any one of the arrangements previously considered to provide a hybrid combination of wind and water powered equipment (not shown) for utilising the energy obtained by the respective turbines.

What is claimed is:

1. A flowing water turbine system comprising an upstanding column having a lower end fixed to a bed below a body of water having an upper surface so that the column is positioned to intercept a laterally flowing current in a the body of water, the column having an upper end extending above the upper surface of the body of water, a sleeve surrounding an upper portion of the column, the sleeve being rotatable about the column, an outer sleeve surrounding the sleeve, the outer sleeve being rotatable about the column with the sleeve and vertically movable with respect to the sleeve, a turbine assembly suitable for interacting with the laterally flowing current, a coupling apparatus coupling the turbine assembly to the outer sleeve for vertical displacement relative to the column, and control means positioned on the column above the upper surface for controlling the vertical position of the turbine assembly relative to the column.

2. A flowing water turbine system as claimed in claim 1 further comprising an air-driven turbine coupled to the column and situated above said body of water.

3. A flowing water turbine system as claimed in claim 1 wherein the turbine assembly comprises a plurality of turbines.

4. A water flowing turbine system as claimed in claim 1 further comprising a housing fixed to an upper end of the upstanding column containing said apparatus for controlling the vertical position of the turbine assembly relative to the column.

5. A flowing water turbine system as claimed in claims 1, or 3 wherein each turbine assembly comprises a rotor supporting a plurality of blades and incorporating a blade pitch control arrangement positioning the blades at a selected pitch.

6. A flowing water turbine system as claimed in claim 5 further comprising an electrical generator coupled to said rotor of each turbine assembly.

7. A flowing water turbine system as claimed in claim 1, further comprising a slewing mechanism connected between the column and the sleeve for orienting the sleeve and outer sleeve with respect to the column.

8. A flowing water turbine system as claimed in claim 7, wherein the slewing mechanism comprises a gear connected to the sleeve, a worm wheel engaging the gear, and a servo motor driving the worm gear.

9. A flowing water turbine system as claimed in claim 1, further comprising a vertical extension fixed to the upper end of the column, and a lifting mechanism coupled to the vertical extension, the lifting mechanism being connectable to said turbine assembly.

10. A flowing water turbine system comprising an upstanding column having a lower end fixed to a bed below a body of water having an upper surface so that the column is positioned to intercept a laterally flowing current in the body of water, the column having an upper end extending above the upper surface of the body of water, a sleeve surrounding an upper portion of the column, an outer sleeve surrounding the sleeve, wherein the outer sleeve is rotatable about the column with the sleeve and vertically moveable with respect to the sleeve, a turbine assembly suitable for interacting with the laterally flowing current, a coupling apparatus coupling the turbine assembly to the outer sleeve for vertical displacement relative to the column, control means for controlling the vertical position of the turbine assembly relative to the column, the turbine assembly including a rotor supporting a plurality of blades and incorporating a blade pitch control arrangement positioning the blades at a selected pitch.

11. A flowing water turbine system comprising an upstanding column having a lower end fixed to a bed below a body of water having an upper surface so that the column is positioned to intercept a laterally flowing current in the body of water, the column having an upper end extending above the upper surface of the body of water, a buoyant flotation element connected to the column, a turbine assembly suitable for interacting with the laterally flowing current, a sleeve surrounding an upper portion of the column, an outer sleeve surrounding the sleeve, wherein the outer sleeve is rotatable about the column with the sleeve and vertically moveable with respect to the sleeve, a coupling apparatus coupling the turbine assembly to the flotation element for vertical displacement relative to the column, control means for controlling the position of the turbine assembly relative to the column, the turbine assembly including a rotor supporting a plurality of blades and incorporating an blade pitch control arrangement positioning the blades at a selected pitch.

12. A flowing water turbine system as claimed in claim 11, wherein the column is of a hollow construction and the buoyant flotation element is situated within the column.

13. A flowing water turbine system as claimed in claim 11, further comprising a support structure coupled to the buoyant flotation element, the support structure being rotatably mounted to the column, and a downwardly depending support for each turbine assembly associated with the flotation element.

14. A flowing water turbine system as claimed in claim 5, 10 or 11, wherein the blade pitch control arrangement includes bearings coupled between the rotor and each blade, a cylindrical body coupled to a root of each blade, each cylindrical body including teeth, and a worm drive engaging the teeth of the cylindrical bodies for adjusting the selected pitch of the blades.

15. A flowing water turbine system as claimed in claim 5, 10 or 11, wherein the blade pitch control arrangement includes bearings coupled between the rotor and each blade, a gear box fixed adjacent to a root of each blade, each gear box including an input shaft and including an output shaft engaging the adjacent root of one of the blades for adjusting the selected pitch of the blades.

16. A flowing water turbine system as claimed in claim 5, 10 or 11, wherein the blade pitch control arrangement provides for selective variation of the pitch of the rotor blades through a range of 180 degrees.

* * * * *

UNITED STATES PATENT AND TRADEMARK OFFICE
CERTIFICATE OF CORRECTION

PATENT NO.    : 6,652,221 B1
DATED         : November 25, 2003
INVENTOR(S)   : Praenkel

It is certified that error appears in the above-identified patent and that said Letters Patent is hereby corrected as shown below:

<u>Title page,</u>
Item [75], the Inventor's name is corrected to -- Fraenkel -- in lieu of "Praenkel"

<u>Column 11,</u>
Line 27, delete the word "a" after the word "in" and before the word "the"
Line 50, correct the word "claims" to -- claim --
Line 51, delete the words "or 3"

Signed and Sealed this

Fourth Day of May, 2004

JON W. DUDAS
*Acting Director of the United States Patent and Trademark Office*